United States Patent
Mansour et al.

(10) Patent No.: US 10,339,547 B2
(45) Date of Patent: Jul. 2, 2019

(54) METHODS AND APPARATUS TO IDENTIFY LOCAL TRADE AREAS

(71) Applicant: The Nielsen Company (US), LLC, New York, NY (US)

(72) Inventors: John P. Mansour, North Aurora, IL (US); Michael J. Zenor, Cedar Park, TX (US); Mitchel Kriss, Long Grove, IL (US); Congrong Lou, Naperville, IL (US)

(73) Assignee: The Nielsen Company (US), LLC, New York, NY (US)

( * ) Notice: Subject to any disclaimer, the term of this patent is extended or adjusted under 35 U.S.C. 154(b) by 765 days.

(21) Appl. No.: 14/870,944

(22) Filed: Sep. 30, 2015

(65) Prior Publication Data
US 2017/0091795 A1    Mar. 30, 2017

(51) Int. Cl.
*G06Q 10/10* (2012.01)
*G06Q 30/02* (2012.01)

(52) U.S. Cl.
CPC .............................. *G06Q 30/0205* (2013.01)

(58) Field of Classification Search
CPC .............................. G06Q 10/10; G06Q 30/02
USPC ........................................................ 705/7.34
See application file for complete search history.

(56) References Cited

U.S. PATENT DOCUMENTS

| | | |
|---|---|---|
| 6,871,183 B2 | 3/2005 | Gilday et al. |
| 7,174,304 B1 | 2/2007 | Boardman |
| 7,379,890 B2 | 5/2008 | Myr et al. |
| 7,386,519 B1 | 6/2008 | Delurgio et al. |
| 7,660,734 B1 | 2/2010 | Neal et al. |
| 7,752,067 B2 | 7/2010 | Fotteler et al. |
| 7,788,124 B2 | 8/2010 | Fotteler et al. |
| 7,848,946 B2 | 12/2010 | Acharya et al. |
| 8,010,404 B1 | 8/2011 | Wu et al. |
| 8,140,381 B1 | 3/2012 | Wu et al. |

(Continued)

OTHER PUBLICATIONS

United States Census Bureau, "Geography—Geographic Terms and Concepts—Block Groups," last revised Dec. 6, 2012, retrieved from <https://www.census.gov/geo/reference/gtc/gtc_bg.html>, retrieved on Sep. 18, 2015 (1 page).

(Continued)

*Primary Examiner* — Nga B Nguyen
(74) *Attorney, Agent, or Firm* — Hanley Flight & Zimmerman, LLC

(57) ABSTRACT

Methods, apparatus, systems and articles of manufacture to identify local trade areas are disclosed. An example method includes selecting, with a processor, census block groups (CBGs) associated with a retailer location, identifying, with the processor, a plurality of stores within the selected CBGs and associated all commodities volume (ACV) values for respective ones of the plurality of stores, calculating, with the processor, similarity index values associated with respective pairs of the plurality of stores, generating, with the processor, local trade areas (LTAs) of subgroups of the plurality of stores based on a comparison of the similarity index values to a similarity threshold value, and when a respective one of the LTAs includes a violation of a releasability criterion, preventing, with the processor, erroneous disclosure of market share information by re-distributing the stores within the respective one of the LTAs to a geographically adjacent LTA.

20 Claims, 11 Drawing Sheets

(56) References Cited

U.S. PATENT DOCUMENTS

| | | | |
|---|---|---|---|
| 8,239,245 | B2 | 8/2012 | Bai et al. |
| 8,265,984 | B2 | 9/2012 | Bai et al. |
| 8,364,516 | B2 | 1/2013 | Anderson et al. |
| 8,392,231 | B2 | 3/2013 | Fotteler et al. |
| 8,639,558 | B2 | 1/2014 | Desai et al. |
| 2001/0049623 | A1 | 12/2001 | Aggarwal et al. |
| 2002/0107819 | A1 | 8/2002 | Ouimet |
| 2002/0143608 | A1 | 10/2002 | Brown |
| 2002/0194039 | A1 | 12/2002 | Bhaskaran et al. |
| 2002/0198759 | A1 | 12/2002 | Gilday et al. |
| 2002/0198882 | A1 | 12/2002 | Linden et al. |
| 2003/0097290 | A1 | 5/2003 | Kiefer |
| 2003/0130883 | A1 | 7/2003 | Schroeder et al. |
| 2003/0208399 | A1 | 11/2003 | Basak et al. |
| 2003/0220773 | A1 | 11/2003 | Haas et al. |
| 2004/0093296 | A1 | 5/2004 | Phelan et al. |
| 2005/0060223 | A1 | 3/2005 | Kelly et al. |
| 2005/0189414 | A1 | 9/2005 | Fano et al. |
| 2005/0278211 | A1 | 12/2005 | Adams |
| 2005/0278217 | A1 | 12/2005 | Adams et al. |
| 2005/0278218 | A1 | 12/2005 | Adams et al. |
| 2005/0278236 | A1 | 12/2005 | Adams et al. |
| 2006/0010022 | A1 | 1/2006 | Kelly et al. |
| 2006/0047560 | A1 | 3/2006 | Adams et al. |
| 2006/0047608 | A1 | 3/2006 | Davis et al. |
| 2006/0149634 | A1 | 7/2006 | Pelegrin et al. |
| 2008/0270363 | A1 | 10/2008 | Hunt et al. |
| 2008/0288312 | A1 | 11/2008 | Miles et al. |
| 2008/0288889 | A1 | 11/2008 | Hunt et al. |
| 2008/0319829 | A1 | 12/2008 | Hunt et al. |
| 2009/0006156 | A1 | 1/2009 | Hunt et al. |
| 2009/0248490 | A1 | 10/2009 | Moncreiff |
| 2010/0063870 | A1* | 3/2010 | Anderson ............ G06Q 10/10 705/7.29 |
| 2010/0169162 | A1 | 7/2010 | Anderson et al. |
| 2010/0169174 | A1 | 7/2010 | Anderson et al. |
| 2013/0144713 | A1 | 6/2013 | Anderson et al. |
| 2014/0067478 | A1* | 3/2014 | Zenor ............... G06Q 30/0204 705/7.34 |
| 2014/0214461 | A1 | 7/2014 | Diliberto et al. |
| 2014/0278768 | A1* | 9/2014 | Zenor ............... G06Q 30/0202 705/7.31 |
| 2016/0034931 | A1* | 2/2016 | D'Agostino ....... G06Q 30/0205 705/7.34 |
| 2016/0140589 | A1* | 5/2016 | Deshpande ........ G06Q 30/0205 705/7.34 |

OTHER PUBLICATIONS

Wikipedia, "Shapefile," last modified Aug. 21, 2015, retrieved from <http://en.wikipedia.org/wiki/shapefile>, retrieved on Sep. 18, 2015 (8 pages).

Abraham et al., "An Implemented System for Improving Promotion Productivity Using Store Scanner Data," Marketing Science, vol. 12, No. 3, Aug. 1, 1993 (22 pages).

Ailawadi et al., "Decomposition of the Sales Impact of Promotion-Induced Stockpiling," Jul. 25, 2006 (54 pages).

Ailawadi et al., "The Benefits of Promotion-Induced Stockpiling," May 9, 2005 (46 pages).

Anderson et al., "Competitve Dynamics of Price Promotions," Jul. 15, 2001 (42 pages).

Beasley et al., "An Examination of Stockpiling Behavior in Response to Price Deals," Academy of Marketing Studies Journal, vol. 2, No. 1, Jan. 1, 1998 (12 pages).

Chan et al., "Decomposing Promotional Effects with a Dynamic Structural Model of Flexible Consumption," Journal of Marketing Research, vol. XLV, Aug. 2008 (14 pages).

Dawes, "Assessing the Impact of a Very Successful Price Promotion on Brand, Category, and Competitor Sales," The Journal of Product and Brand Management, vol. 13, No. 5, Jul. 2004 (12 pages).

Foekens et al., "Varying Parameter Models to Accommodate Dynamic Promotion Effects," Journal of Econometrics, vol. 89, Nov. 26, 1999 (20 pages).

Huang et al., "Price Promotions—How Much Volume is Discounted That You Would Sell Anyway at the Normal Price?," Ehrenberg-Bass Institute for Marketing Science, UniSA, Report 43, Dec. 2007 (2 pages).

Kopalle et al., "The Dynamic Effect of Discounting on Sales: Empirical Analysis and Normative Pricing Implications," Marketing Science, vol. 18, No. 3, Aug. 1, 1999 (16 pages).

Kumar et al., "Measuring the Effect of Retail Store Promotions on Brand and Store Substitution," Journal of Marketing Research, vol. 25, No. 2, May 1988 (8 pages).

Lee, "A Study of Baseline Estimates," Research Paper 2006-3, Florida Department of Citrus, Sep. 2006 (8 pages).

Leeflang et al., "Decomposing the Sales Promotion Bump Accounting for Cross-Category Effects," International Journal of Research in Marketing, vol. 25, Sep. 2008 (14 pages).

Leeflang, "Modeling Competitive Reaction Effects," Schmalenbach Business Review, vol. 60, Oct. 2008 (38 pages).

Leeflang et al., "Building Models for Marketing Decisions," International Series in Quantitative Marketing, Kluwer Academic Publishers, Feb. 29, 2000 (6 pages).

Luo, "Examine the Factors Influencing Brand-Switching: The Effects of Advertising and Promotion," Dissertation, 2006, retrieved from <http://edissertations.nottingham.ac.uk/326/1/06MAlizz119.pdf> retrieved on Nov. 3, 2015 (105 pages).

Macdonald et al., "How do Retail Prices React to Minimum Wage Increases?" Federal Reserve Bank of Chicago, WP 2000-20, Dec. 2000 (41 pages).

Moon et al., "Estimating Promotion Response When Competitive Promotions are Unobservable," Journal of Marketing Research, vol. XLIV, Aug. 2007 (14 pages).

Mulqueen et al., "Developing Dynamic Work Roles Using Jaccard Similarity Indices of Employee Competency Data," Ergometrika, vol. 2, Feb. 2001 (11 pages).

Naik et al., "Planning Marketing-Mix Strategies in the Presence of Interaction Effects: Empirical and Equilibrium Analyses," Apr. 2003 (54 pages).

Nielsen/IRI "Intro Session," Apr. 11, 2005, Retrieved from <https://web.archive.org/web20050801000000*/https://faculty.fuqua.duke.edu/~moorman/GeneralMills/Section1/Julie%20Beattie%20Nielsen.ppt>, retrieved on Nov. 17, 2014 (39 pages) NPL in 2 parts.

Persson, "Modeling the Impact of Sales Promotion on Store Profits," Stockholm School of Economics, Jan. 1995 (327 pages).

Rivalwatch, "RivalWatch 2000-2001," Screenshots, Jan. 2000-2004 (82 pages).

Tenn, "Estimating Promotional Effects with Retailer-Level Scanner Data," Jul. 2006 (35 pages).

Tomca et al., "A Flexible Tool for Jaccard Score Evaluation," retrieved from <http://rti.etf.bg.ac.yu/rti/ebi/dipl/nela/paper.html>, retrieved on Aug. 21, 2008 (5 pages).

United States Patent and Trademark Office, "Non-Final Office Action," issued in connection with corresponding U.S. Appl. No. 12/493,495, dated Oct. 23, 2014 (9 pages).

United States Patent and Trademark Office, "Notice of Allowance," issued in connection with corresponding U.S. Appl. No. 12/493,643, dated Nov. 26, 2012 (40 pages).

United States Patent and Trademark Office, "Final Office Action," issued in connection with corresponding U.S. Appl. No. 12/493,495, dated Jul. 19, 2012 (42 pages).

United States Patent and Trademark Office, "Non-Final Office Action," issued in connection with corresponding U.S. Appl. No. 12/493,643, dated Jan. 12, 2012 (50 pages).

United States Patent and Trademark Office, "Non-Final Office Action," issued in connection with corresponding U.S. Appl. No. 12/493,484, dated Dec. 30, 2011 (14 pages).

United States Patent and Trademark Office, "Final Office Action," issued in connection with corresponding U.S. Appl. No. 12/493,484, dated Jul. 27, 2012 (17 pages).

United States Patent and Trademark Office, "Requirement for Restriction/Election," issued in connection with corresponding U.S. Appl. No. 12/493,484, dated Oct. 20, 2011 (6 pages).

United States Patent and Trademark Office, "Requirement for Restriction/Election," issued in connection with corresponding U.S. Appl. No. 12/493,643, dated Oct. 24, 2011 (7 pages).

(56) References Cited

OTHER PUBLICATIONS

United States Patent and Trademark Office, "Non-Final Office Action," issued in connection with corresponding U.S. Appl. No. 12/493,495, dated Nov. 14, 2011 (27 pages).
United States Patent and Trademark Office, "Non-Final Office Action," issued in connection with corresponding U.S. Appl. No. 13/750,429, dated Nov. 25, 2014 (11 pages).
United States Patent and Trademark Office, "Final Office Action," issued in connection with corresponding U.S. Appl. No. 13/750,429, dated Mar. 6, 2015 (12 pages).
United States Patent and Trademark Office, "Final Office Action," issued in connection with corresponding U.S. Appl. No. 12/493,495, dated Mar. 6, 2015 (11 pages).
United States Patent and Trademark Office, "Non-Final Office Action," issued in connection with corresponding U.S. Appl. No. 12/493,484, dated Mar. 27, 2015 (16 pages).
United States Patent and Trademark Office, "Final Office Action," issued in connection with corresponding U.S. Appl. No. 12/493,484, dated Sep. 16, 2015 (19 pages).
Van Heerde et al., "Decomposing the Sales Promotion Bump with Store Data," Marketing Science, vol. 23, No. 3, Aug. 1, 2004 (19 pages).
Van Heerde et al., "How Promotions Work: SCAN PRO-Based Evolutionary Model Building," Schmalenbach Business Review, vol. 54, Jul. 2002 (23 pages).
Van Heerde et al., "The Estimation of Pre- and Postpromotion Dips with Store-Level Scanner Data," Journal of Marketing Research, vol. 37, No. 3, Aug. 2000 (13 pages).

* cited by examiner

200

| Store ID | Census Block Group | ACV |
|---|---|---|
| 1 | 1 | $100,000 |
| 1 | 2 | $200,000 |
| 2 | 1 | $400,000 |
| 2 | 2 | $100,000 |
| 2 | 3 | $200,000 |
| 3 | 2 | $400,000 |
| 3 | 3 | $200,000 |

| | 502 | 504 | 506 | 508 |
|---|---|---|---|---|
| | LTA | STORE | MARKET SHARE | ACV |
| | 1 | 1 | 55% | $55,000 |
| | 1 | 2 | 25% | $25,000 } $100,000 |
| | 1 | 3 | 20% | $20,000 |
| | 2 | 17 | 31% | $31,000 |
| | 2 | 12 | 23% | $23,000 } $100,000 |
| | 2 | 9 | 20% | $20,000 |
| | 2 | 15 | 26% | $26,000 |

| | 502 | 504 | 506 | 508 |
|---|---|---|---|---|
| | LTA | STORE | MARKET SHARE | ACV |
| Re-distributed LTA | 2 | 1 | 27% | $55,000 |
| | 2 | 2 | 12.5% | $25,000 |
| | 2 | 3 | 10% | $20,000 |
| | 2 | 17 | 15.5% | $31,000 } $200,000 |
| | 2 | 12 | 11.5% | $23,000 |
| | 2 | 9 | 10% | $20,000 |
| | 2 | 15 | 13% | $26,000 |

FIG. 5B

METHODS AND APPARATUS TO IDENTIFY LOCAL TRADE AREAS

FIELD OF THE DISCLOSURE

This disclosure relates generally to market research, and, more particularly, to methods and apparatus to identify local trade areas.

BACKGROUND

In recent years, clients, businesses and/or entities with an interest in identifying geographical markets in which to promote/advertise a product or service of interest have relied upon U.S. Census Bureau information. The Census Bureau information includes detailed demographics information in census blocks or census block groups (CBGs) that represent statistical divisions of census tracts that are defined to contain between 600 and 3,000 people. In some examples, clients evaluate Census Bureau information to identify particular geographic portions of a market for promotion/advertising activity in an effort to reach as many potential consumers as possible.

BRIEF DESCRIPTION OF THE DRAWINGS

FIG. 2 is an example store list generated by an example local trade area engine of the system of FIG. 1.

FIGS. 5A and 5B are example market share tables generated by an example release requirement manager of the system of FIG. 1.

DETAILED DESCRIPTION

Figure 1:
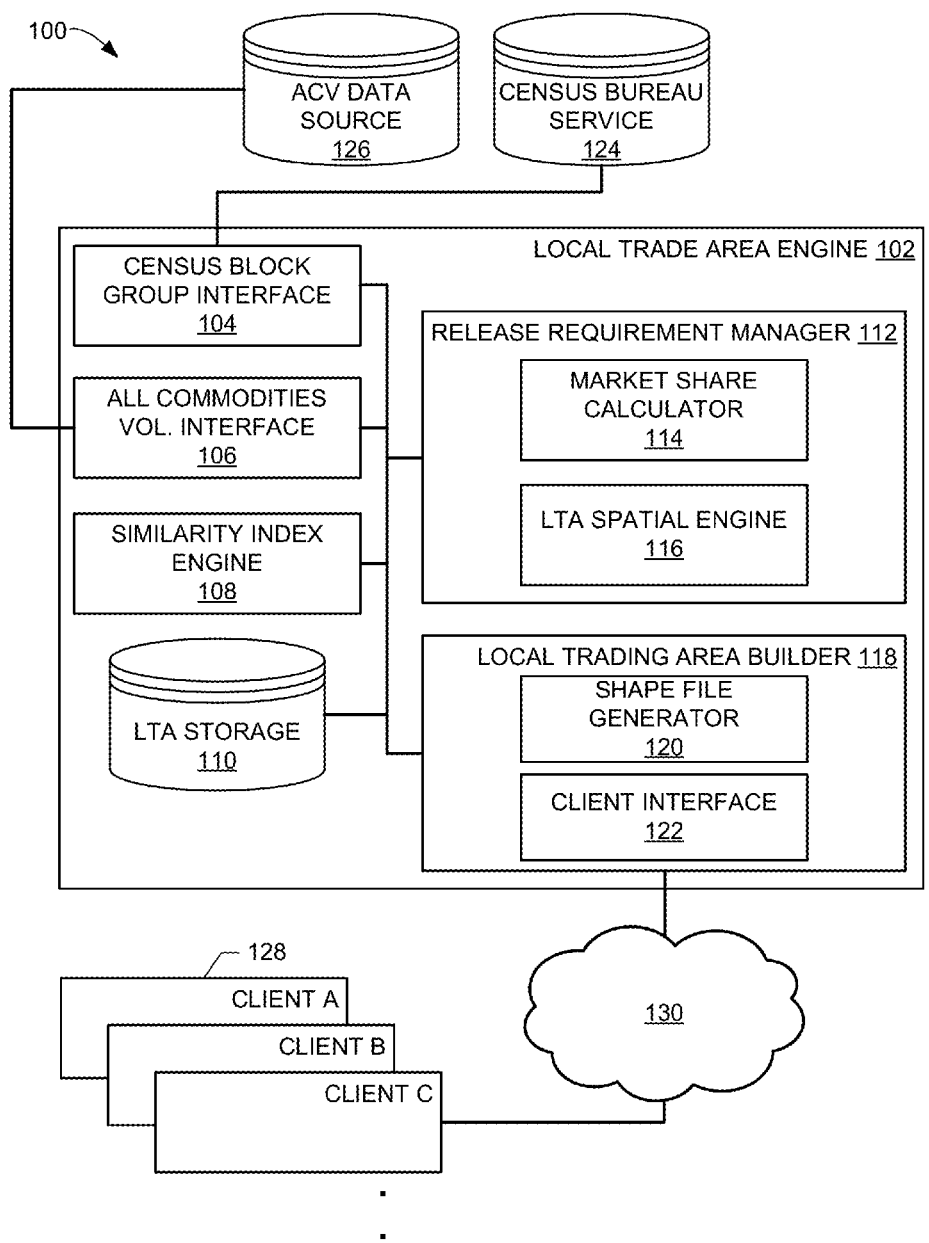
FIG. 1 is a schematic illustration of a local trade area development system constructed in accordance with the teachings of this disclosure.

Census Bureau information provided by the U.S. Census Bureau includes detailed demographic data, such as age, gender, race, housing details, employment status, type of employment, income, educational attainment, field of degree, marital status, etc. While the Census Bureau information includes detailed information that may help businesses and/or entities (hereinafter referred to as "clients") seeking to market one or more products and/or services, such Census Bureau information does not reveal information associated with existing market share information of retailers within a particular geographic area. As such, in the event an example client chooses to initiate marketing activity within a particular census block group (CBG), that client may not appreciate how saturated the CBG is with respect to competitive retailers in that area. Market share information is also represented as All Commodities Volume (ACV) information, which indicates how much people spend at a particular retailer from a defined CBG. For example, a retailer ACV of $100,000 means that households within a CBG of interest will spend $100,000 with that particular retailer.

The Nielsen Company® develops and manages a data service referred to as Spectra™, which includes trading area decomposition models that identify spending (e.g., channel spending, store spending, etc.) of households from retailers in particular CBGs. While the ACV information developed by the Spectra™ services reveals spending amounts at retailers from consumers within CBGs, such retailers may have an influence on two or more particular CBGs. In the event a retailer targets only that CBG within which their store is located (e.g., their "home CBG"), one or more competitive stores outside the geographical boundary of their CBG may have a degree of influence on the retailer's store. As such, marketing efforts within the home CBG may result in wasted advertising resources that do not accurately target other geographical areas having potential consumers. Example methods, apparatus, systems and/or articles of manufacture disclosed herein improve the granularity of trading areas over existing ACV information services, thereby providing improved precision in marketing efforts, improved marketing productivity, and reduced waste of marketing and/or computational resources.

Additionally, examples disclosed herein prevent erroneous exposure of retailer data in view of releasability criteria. In some examples, releasability criteria includes contracts and/or rules established by retailers to protect the disclosure of information that may be deemed harmful to their competitive strategies within a market of interest. In some examples, the releasability criteria require a threshold number of stores present within a particular geographic area of interest before any data associated with that area can be divulged. In still other examples, the releasability criteria require that stores present within a particular geographic area of interest exhibit a particular channel mix, such as stores that participate in one or more of a drug category, a food category, a home furnishings category, etc. In some examples, a retailer may only agree to provide sales information to a market research entity if the revealed sales data is less than a releasability criterion identifying a 50% market share for a disclosed trading area of interest. Examples disclosed herein generate local trading areas (LTAs) that identify clusters of retailers/stores in discrete sets such that a mean ACV similarity value is maximized within each set, and minimized between sets. However, after generating the LTAs, examples disclosed herein evaluate each set to verify erroneous disclosure of retailer market information does not violate the releasability criteria/criterion established by the respective retailer.

Turning to FIG. 1, an example local trade area development system 100 includes a local trade area (LTA) engine 102, a census block group (CBG) interface 104, an all commodities volume (ACV) interface 106, a similarity index engine 108, and an LTA storage 110. The example local trade area development system of FIG. 1 also includes a release requirement manager 112, including a market share calculator 114, an LTA spatial engine 116, and an LTA builder 118, including a shape file generator 120, and a client interface 122. The example LTA engine 102 is communicatively connected to an example Census Bureau service 124 via the example CBG interface 104, communicatively connected to an example ACV data source 126 via the example ACV interface 106, and communicatively connected to one or more clients 128 via an example network 130 (e.g., the Internet) via the example client interface 122. While the illustrated example of FIG. 1 includes the example Census Bureau service 124, such as information provided by the U.S. Census Bureau, examples disclosed herein are not limited thereto. One or more additional or alternative sources of household and/or demographic data within one or more geographic areas of interest may be considered. Additionally, while the illustrated example of FIG. 1 includes the example ACV data source 126, such as the Spectra™ services provided by The Nielsen Company®, example disclosed herein are not limited thereto. One or more additional or alternative sources of market sales data associated with retailers within a geographic area of interest may be considered.

In operation, the example CBG interface 104 selects one or more census block(s) of interest from the example census bureau service 124, and the example ACV interface 106 identifies ACV information in the example ACV data source 126 that is associated with each store within the selected CBG. The example similarity index engine 108 builds a list of store identifiers and associated CBGs to which they belong, as well as associated ACV information that is associated with each store, as shown in FIG. 2. As used herein, a "similarity" between stores reflects a degree to which each store shares an amount of customers and/or sales. For instance, a relatively large retailer that sells a relatively large category of products (e.g., Walmart®, which sells furniture, toys, consumer electronics, automotive supplies, etc.) may exhibit a relatively large size (e.g., square footage), number of employees and/or annual sales. On the other hand, a relatively smaller retailer that sells a relatively smaller subset of categories of products (e.g., Walgreens®, which sells toys, over-the-counter drugs, snacks, etc.) may have a relatively smaller size, number of employees and/or annual sales. However, these two retailers may exhibit a strong degree of similar consumers in a particular geography of interest. As such, "similarity" is sometimes used herein to reflect a degree of sales similarity and/or consumer similarity. In the illustrated example of FIG. 2, a store list 200 includes a store identifier (ID) column 202, a CBG column 204 to identify the CBG corresponding to the respective store IDs, and an ACV column 206 to identify ACV information associated with the respective stores. In some examples, the contents of the example store list 200 are provided by the example ACV data source 126 based on one or more prior data collection activities when determining ACV information on a periodic, aperiodic, scheduled and/or manual basis. In the illustrated example of FIG. 2, store ID 1 has an ACV value of $100,000, which reflects that households in CBG 1 are estimated to spend $100,000 in that particular store.

To calculate similarity index values for all pairs of stores, the example similarity index engine 108 calculates similarity index values (e.g., a Jaccard similarity index) for pairs of stores based on an overlap of their trading areas (e.g., whether a store has a market influence in one or more CBGs). The Jaccard similarity index for a pair of stores is calculated in a manner consistent with example Equation 1.

$$\text{Sim. Index} = \frac{\text{(Total } ACV \text{ for both stores from common } CBG)}{\text{(Total } ACV \text{ for both stores)}}. \quad \text{Equation 1}$$

To illustrate the application of example Equation 1, store ID 1 from the illustrated example of FIG. 2 has a total ACV value of $300,000 (e.g., $100,000 associated with CBG 1 and $200,000 associated with CBG 2), and store ID 2 has a total ACV value of $700,000 (e.g., $400,000 associated with CBG 1, $100,000 associated with CBG 2, and $200,000 associated with CBG 3). These two stores share volume from two separate CBGs (i.e., CBG 1 and CBG 2), from which they collectively derive an ACV value of $800,000. Application of example Equation 1 results in an index value of 0.80. While the example similarity index engine 108 uses the example Jaccard similarity index above, examples disclosed herein are not limited thereto. One or more additional and/or alternate techniques may be employed to calculate the similarity index.

Figure 3:
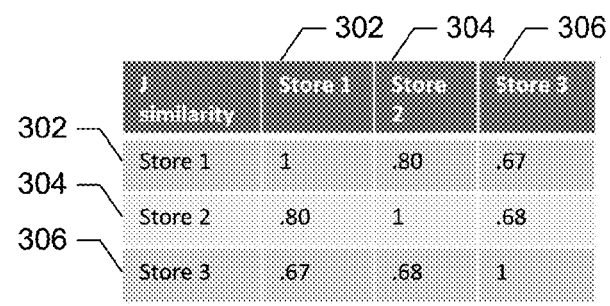
FIG. 3 is an example similarity matrix generated by an example similarity index engine of the system of FIG. 1.

The example similarity index engine 108 builds a similarity matrix 300 for all store pairs of interest, as shown in the illustrated example of FIG. 3. Using the example three stores from the illustrated example of FIG. 2, the example similarity matrix 300 includes store ID 1 (302), store ID 2 (304) and store ID 3 (306) in matrix format. The calculated similarity index values illustrate a degree of sales similarity between respective stores, in which the matrix value of a store compared with itself equals one (e.g., a perfect match). Index values that are closer to 1.00 are indicative of stores having a greater degree of sales similarity therebetween. The example similarity index engine 108 compares the similarity index value of each store pair with a threshold value to identify clusters of similar stores. For example, assuming a first cluster of interest is defined as requiring a similarity index value of 0.75 or higher, and a second cluster of interest is defined as requiring a similarity index between 0.60 and 0.74.

Figure 4:
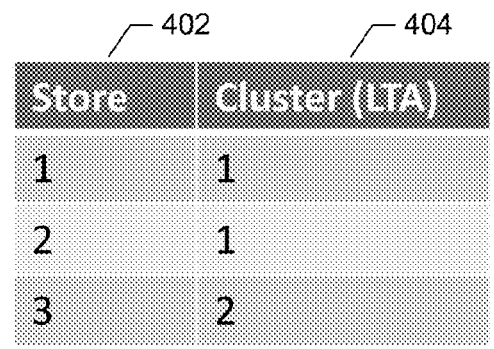
FIG. 4 is an example LTA table generated by an example LTA builder of the system of FIG. 1.

As such, stores associated with store ID 1 (302) and store ID 2 (304) meet the threshold criteria of a pair with an index value of 0.75 or higher, and the example LTA builder 118 assigns them to a first LTA, as shown in the illustrated example LTA table 400 of FIG. 4. The example LTA table 400 of FIG. 4 includes a store ID column 402 and an LTA (cluster) column 404 to identify which LTA a corresponding store ID belongs to. The resulting LTAs represent a list of stores that compete for spending from a common group of consumers. Additionally, these LTAs reflect sets of stores having ACV similarities amongst themselves, in which other LTAs reflect sets of stores having ACV similarities amongst themselves, in which the separate LTAs reflect substantially different ACV similarities between each other. In contrast to a retailer merely relying upon defined CBGs by the US Census Bureau to identify candidate geographies with which to invoke marketing efforts, the example LTAs 404 reveal target marketing areas indicative of competitive stores within a geographical area having a degree of sales similarity with the retailer's store. As such, the retailer can identify geographic areas with a greater degree of relevance and precision, as well as reduce computational waste when calculating candidate marketing areas of interest to pursue.

However, releasing these LTAs for syndicated distribution may not be authorized in the event that one or more releasability requirements are violated. To illustrate, an example market share table 500 of FIG. 5A includes example LTAs generated by the example LTA builder 118. In the illustrated example of FIG. 5A, the releasability criteria for a client relates to market share for the purpose of example and not limitation. The market share table 500 includes an LTA column 502, a store ID column 504 to illustrate which stores are included in the respective LTA, a market share percentage column 506 to illustrate a market share percentage that the respective store has in the respective LTA, and an ACV value column 508 to illustrate the ACV value of the respective store in the respective LTA. The total ACV value for stores associated with LTA 1 is $100,000, and the total ACV value for stores associated with LTA 2 is also $100,000. Continuing with the example of a releasability requirement of less than 50% market share for store ID 1, the illustrated market share column 506 indicates that because store ID 1 has a 55% market share (i.e., store ID 1 has an ACV value of $55,000 for the geographic area associated with LTA 1), then any release of the information associated with LTA 1 would violate the retailer's requirements. However, assuming for this example that all the other stores have the same threshold percentage releasability requirement, then no other stores are in violation of releasing syndicated data associated with LTA 1 or LTA 2.

To protect the interests of the client, satisfy contractual obligations and/or otherwise prevent unauthorized or erroneous disclosure of LTA information that fails to comply with the releasability requirements, the example offending LTA (i.e., LTA 1 in this example) is dissolved and/or otherwise disbanded by the example LTA spatial engine 116 to distribute the stores within LTA 1 to one or more geographically adjacent LTAs. For this example, assume that the example LTA spatial engine 116 identifies LTA 2 as the adjacent LTA to LTA 1, in which all of the stores previously associated with LTA 1 (i.e., store ID 1, store ID 2 and store ID 3) are distributed to LTA 2.

FIG. 5B illustrates the example market share table 500 after the example LTA spatial engine 116 redistributes the stores into LTA 2, and the example market share calculator 114 recalculates market share percentage values for each store in the redistributed LTA. While each of the stores in the example market share table 500 still reflect the same ACV values (e.g., store ID 1 still has an ACV value of $55,000), because the total ACV values for all stores within LTA 2 is $200,000 (instead of the previous total ACV values of $100,000 for each LTA), no single store violates the releasability requirement of 55% market share for the geographic area associated with LTA 2. As such, market data associated with LTA 2 may be deemed safe for syndicated distribution. As described above, while the illustrated example of FIGS. 5A and 5B include releasability criteria related to market share, the example market share calculator 114 may analyze and/or otherwise evaluate any other type of releasability criteria/criterion including, but not limited to, whether a threshold number of stores is present within an LTA, whether a channel distribution of stores within the LTA includes a particular channel mix, etc.

To prepare the LTA for syndicated distribution, the example LTA spatial engine 116 calculates a geographical boundary of each LTA of interest. Additionally, the example shape file generator 120 generates a distribution shape file associated with the geographical boundaries associated with each LTA of interest.

Figure 6:
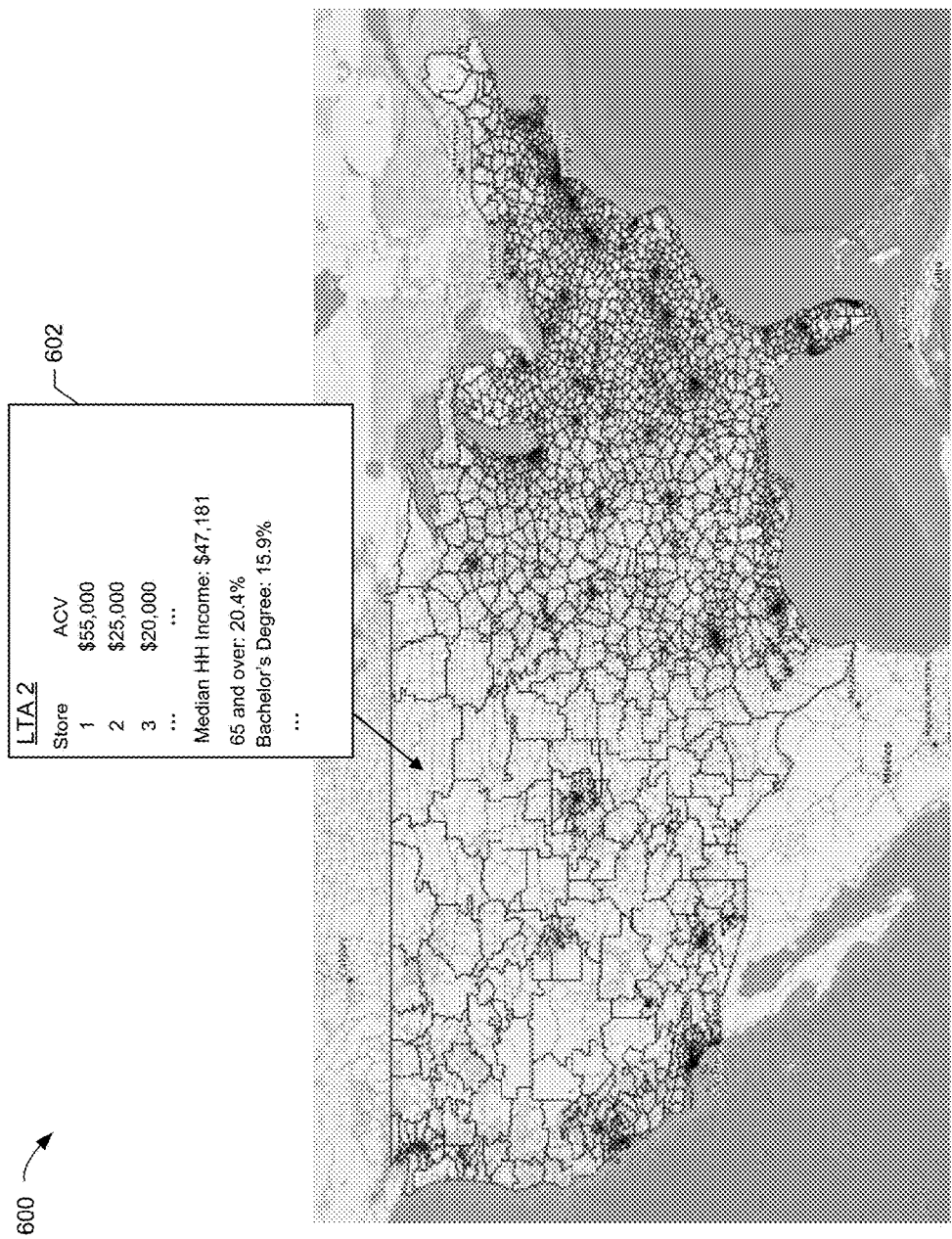
FIG. 6 is an example LTA map generated by an example LTA builder of the system of FIG. 1.

FIG. 6 illustrates an example LTA map 600 rendered from the shape file generated by the example shape file generator 120. In the illustrated example of FIG. 6, the LTA map 600 includes a graphical representation of LTA geographical boundaries that may be rendered by the example LTA builder 118 in response to a client request via the example client interface 122. In other examples, the LTA builder 118 sends the distribution shape file to the client 128 in response to a request for information associated with LTAs of interest. In some examples, the LTA builder 118 includes CBG demographic information of interest in the example distribution shape file, which may allow one or more interactive functions of the shape file. In still further examples, the shape file adheres to a geospatial vector data format for geographic information system (GIS) software developed by the Environmental Systems Research Institute (ESRI).

When the example LTA builder 118 detects a selection of a particular LTA via the client interface 122 or the example LTA map 600 detects a selection of a particular LTA, the information associated with that LTA and/or Census Bureau information is presented to a viewer (e.g., the client 128). In the illustrated example of FIG. 6, the client interface 122 detects selection of LTA 2 (e.g., a mouse click) to cause the shape file generator 120 to render a market data window 602 to appear that is associated with LTA 2. The example market data window 602 includes information from the example market share table 500 of FIG. 5B, as well as demographic data from the example census bureau service 124.

Knowledge of relevant LTAs for marketing efforts permits the retailer to apply examples disclosed herein to any type of marketing effort. In some examples, the retailer may pursue a digital marketing campaign to advertise via digital media, such as localized web pages, music services (e.g., Pandora®) and/or social media (e.g., Facebook®, Twitter®, etc.). If the retailer is monitoring Twitter® for indicators of a product or service that the retailer provides (e.g., Bourbon), then the retailer can identify particular geo-locations in which those indicators occur. For example, the retailer may identify Bourbon tweets associated with Twitter® that coincide with particular locality indicators (e.g., #Chicago, #Schaumburg, #Lincoln Park, etc.). Because the retailer has information related to (a) their product of interest and (b) location(s) with which their product of interest has a degree of interest, then example methods, apparatus, systems and/or articles of manufacture disclosed herein can identify relevant LTAs within which the retailer should invest further marketing resources. Additionally, because product information and location information are identified with one or more relevant LTAs, LTA sales data may be analyzed and/or reported (e.g., sales responses to marketing activity within one or more LTAs) without concern for releasability violation(s).

While an example manner of implementing the LTA engine 102 of FIG. 1 is illustrated in FIGS. 1-4, 5A, 5B and 6, one or more of the elements, processes and/or devices illustrated in FIG. 1 may be combined, divided, re-arranged, omitted, eliminated and/or implemented in any other way. Further, the example CBG interface 104, the example ACV interface 106, the example similarity index engine 108, the example LTA storage 110, the example release requirement manager 112, the example market share calculator 114, the example LTA spatial engine 116, the example LTA builder 118, the example shape file generator 120, the example client interface 122 and/or, more generally, the example LTA engine 102 of FIG. 1 may be implemented by hardware, software, firmware and/or any combination of hardware, software and/or firmware. Thus, for example, any of the example CBG interface 104, the example ACV interface 106, the example similarity index engine 108, the example LTA storage 110, the example release requirement manager 112, the example market share calculator 114, the example LTA spatial engine 116, the example LTA builder 118, the example shape file generator 120, the example client interface 122 and/or, more generally, the example LTA engine 102 of FIG. 1 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example CBG interface 104, the example ACV interface 106, the example similarity index engine 108, the example LTA storage 110, the example release requirement manager 112, the example market share calculator 114, the example LTA spatial engine 116, the example LTA builder 118, the example shape file generator 120, the example client interface 122 and/or, more generally, the example LTA engine 102 of FIG. 1 is/are hereby expressly defined to include a tangible computer readable storage device or storage disk such as a memory, a digital versatile disk (DVD), a compact disk (CD), a Blu-ray disk, etc. storing the software and/or firmware. Further still, the example LTA engine 102 of FIG. 1 may include one or more elements, processes and/or devices in addition to, or instead of, those illustrated in FIGS. 1-4, 5A, 5B and 6, and/or may include more than one of any or all of the illustrated elements, processes and devices.

Flowcharts representative of example machine readable instructions for implementing the LTA engine 102 of FIG. 1 is shown in FIGS. 7-10. In these examples, the machine readable instructions comprise a program for execution by a processor such as the processor 1112 shown in the example processor platform 1100 discussed below in connection with FIG. 11. The program(s) may be embodied in software stored on a tangible computer readable storage medium such as a CD-ROM, a floppy disk, a hard drive, a digital versatile disk (DVD), a Blu-ray disk, or a memory associated with the processor 1112, but the entire program(s) and/or parts thereof could alternatively be executed by a device other than the processor 1112 and/or embodied in firmware or dedicated hardware. Further, although the example programs are described with reference to the flowchart illustrated in FIGS. 7-10, many other methods of implementing the example LTA engine 102 may alternatively be used. For example, the order of execution of the blocks may be changed, and/or some of the blocks described may be changed, eliminated, or combined.

As mentioned above, the example processes of FIGS. 7-10 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 7-10 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Figure 7:
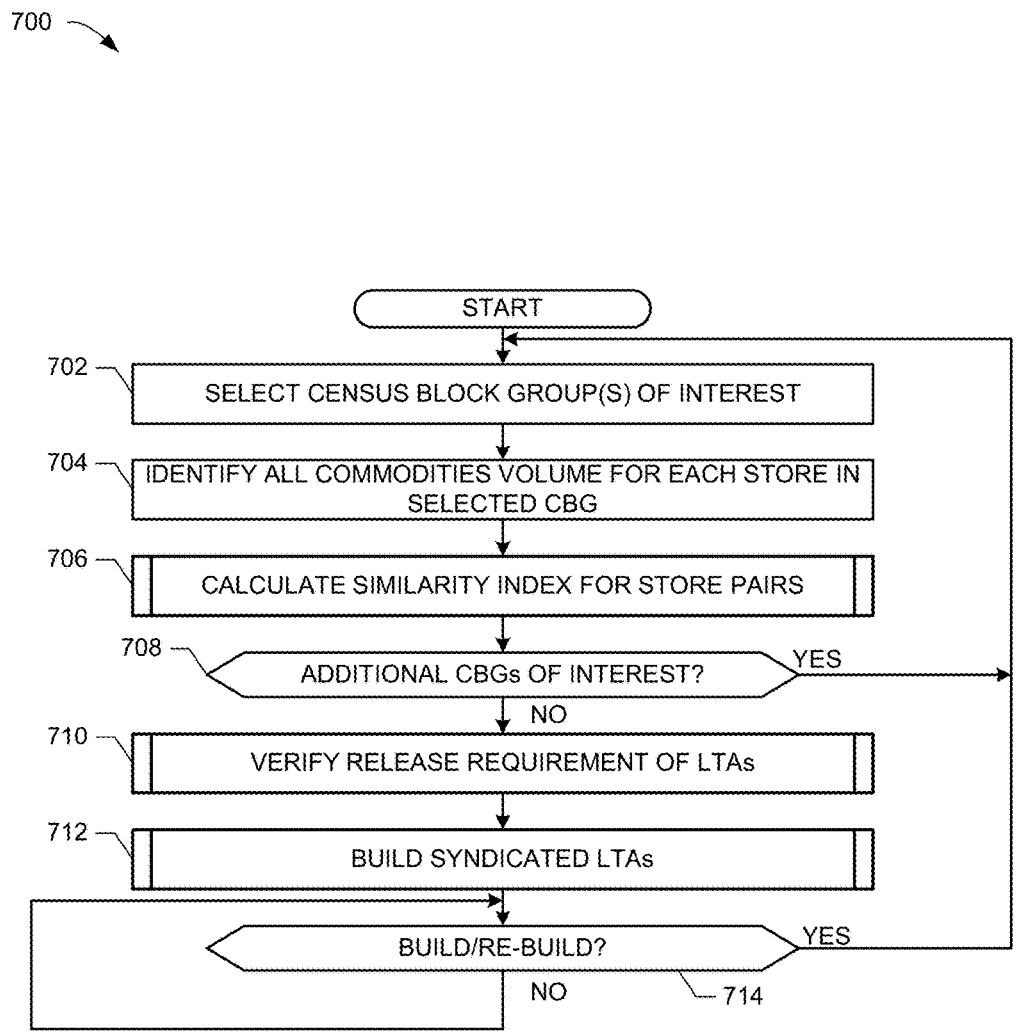
FIGS. 7-10 are flowcharts representative of example computer readable instructions, that may be executed to implement the local trade area development system of FIG. 1.

The program 700 of FIG. 7 begins at block 702 where the example CBG interface 104 selects a CBG of interest and the example ACV interface 106 identifies ACV values for each store in the selected CBG (block 704). The example similarity index engine 108 calculates similarity index values for all pairs of stores (block 706), and the example CBG interface 104 determines whether one or more additional CBGs of interest are to be evaluated (block 708). If so, then control returns to block 702 to select an additional CBG of interest for evaluation. As described above, and as described in further detail below, the calculation of similarity index values for pairs of stores also assigns those stores to particular LTAs based on an index overlap. In some examples, evaluation of CBGs includes a focused geographic area of interest, such as a particular neighborhood, a particular city, or a particular county. In still other examples, evaluation of CBGs includes a relatively larger geographic area of interest, such as a particular metropolitan area, a particular state, a particular region of states, or a particular country.

While the stores associated with the CBGs of interest are assigned to particular LTAs, the example release requirement manager 112 verifies that release requirement rules (releasability criteria) for each store have been satisfied without violation (block 710). As described above, and as described in further detail below, in the event one or more LTAs includes a store in which releasability rules have been violated, the offending LTA is disbanded and the stores previously associated with that offending LTA are distributed to one or more neighboring LTAs in an effort to satisfy the releasability rules and prevent unauthorized disclosure of retailer information that could jeopardize a competitive advantage. The LTAs that are deemed appropriate for release are built by the example LTA builder 118 in a manner that permits graphical representation in response to one or more client requests for data associated with one or more LTAs (block 712), thereby facilitating analysis and/or reporting of sales responses. Additionally, because markets may change over time with particular new stores emerging in particular geographic areas and/or other particular stores closing in the particular geographic areas, the example LTA engine 102 determines whether to build/rebuild new LTAs to reflect the changing landscape (block 714). In some examples, releasability criteria are time dependent and such criteria are checked/verified over time periods of interest. LTAs of interest may be generated for a particular time period (e.g., two years) so that no releasability violations occur when analyzing past sales information. In other words, LTA information may be built at a first time, and re-built at a second time to consider a dynamic nature of the LTAs (e.g., new stores added and/or otherwise participating in a geographic area of interest).

Figure 8:
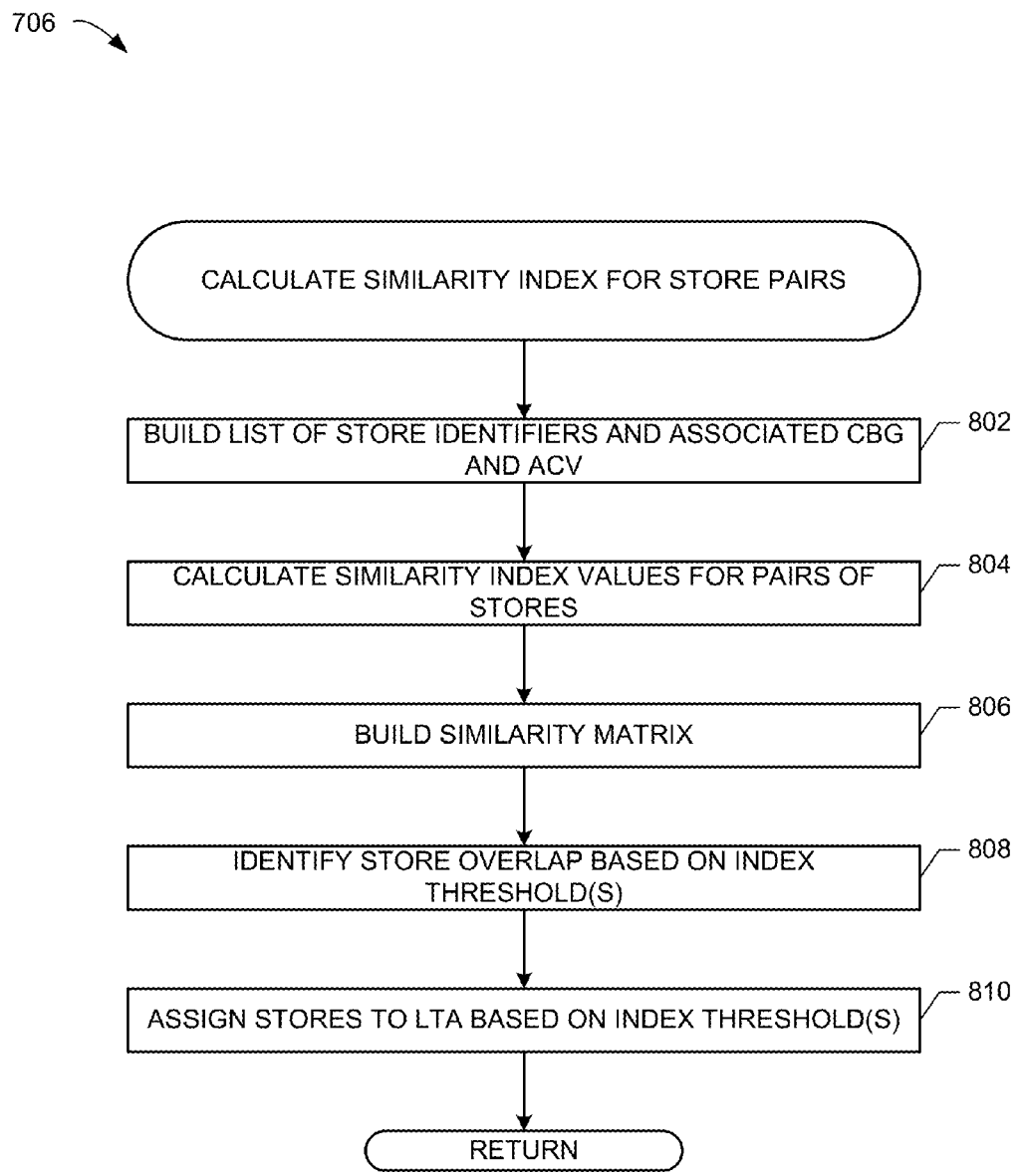

FIG. 8 includes additional detail associated with calculating similarity index values for all pairs of stores within one or more selected CBGs of interest (block 706). In the illustrated example of FIG. 8, the example similarity index engine 108 builds a list of store identifiers to identify their associated CBG and associated ACV value (block 802), as shown above in connection with FIG. 2. The example similarity index engine 108 calculates a similarity index for all pairs of stores (block 804), such as by way of application of example Equation 1. As described above, Equation 1 is an example manner of calculating the similarity index, but examples disclosed herein are not limited thereto. Additionally, the example similarity index engine 108 builds a similarity matrix (block 806), as shown above in connection with FIG. 3. In some examples, a threshold value is applied to determine which pairs of stores exhibit a relatively greatest degree of similarity, which is a reflection of a degree of trading overlap therebetween. The example similarity index engine 108 identifies which pairs of stores satisfy the threshold value (block 808), and the example LTA builder 118 assigns stores to an LTA based on the threshold comparison (block 810), as shown in connection with the example LTA table 400 of FIG. 4. The resulting LTAs may be stored in the example LTA storage 110.

Figure 9:
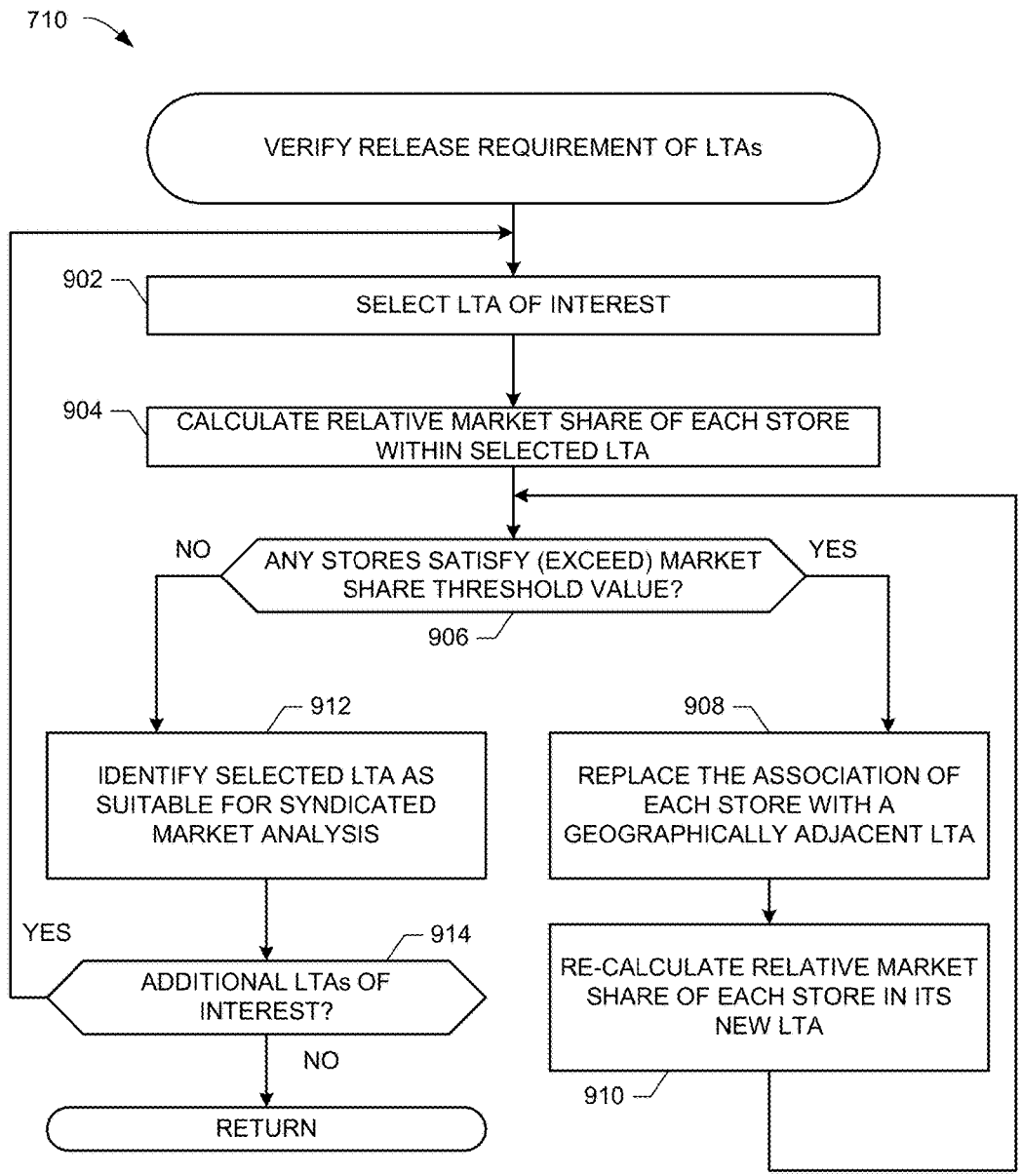

FIG. 9 includes additional detail associated with verifying release requirements of the LTAs identified by the example LTA builder 118 (block 710). In the illustrated example of FIG. 9, the example market share calculator 114 retrieves an LTA of interest (block 902), and calculates a relative market share of each store within the selected LTA (block 904), as shown in the example market share table 500 of FIG. 5A. If the example market share calculator 114 identifies that a store satisfies (exceeds) a market share releasability rule (e.g., the store contributes more than 50% market share for the geography associated with the LTA) (block 906), then the example LTA spatial engine 116 replaces the LTA association of all stores within the LTA (including the offending store) with an alternate LTA that is geographically adjacent (block 908). Generally speaking, by re-associating all of the stores from the LTA having an offending store to an adjacent LTA, the resulting geography and number of stores within the adjacent LTAs increases, thereby reducing a market influence impact that each store has on its geographic area. In effect, if one particular store exceeded its relative market share within the offending LTA, then its participation in the adjacent LTA includes a greater number of stores, thereby reducing its relative market share in an effort to satisfy the releasability requirement. The example market share calculator 114 re-calculates the market share of all the LTAs that have had stores added to them (block 910), and control returns to block 906 to determine if the augmented LTA still includes any stores that satisfy (e.g., exceed) the releasability rule.

If no stores within the selected LTA satisfy (e.g., exceed) the releasability rule (block 906), then the release requirement manager 112 identifies the selected LTA as suitable for syndicated distribution and further market analysis (block 912). If one or more additional LTAs of interest are to be checked to determine compliance with releasability rules, as determined by the example release requirement manager 112 (block 914), then control returns to block 902 to select another LTA of interest.

Figure 10:
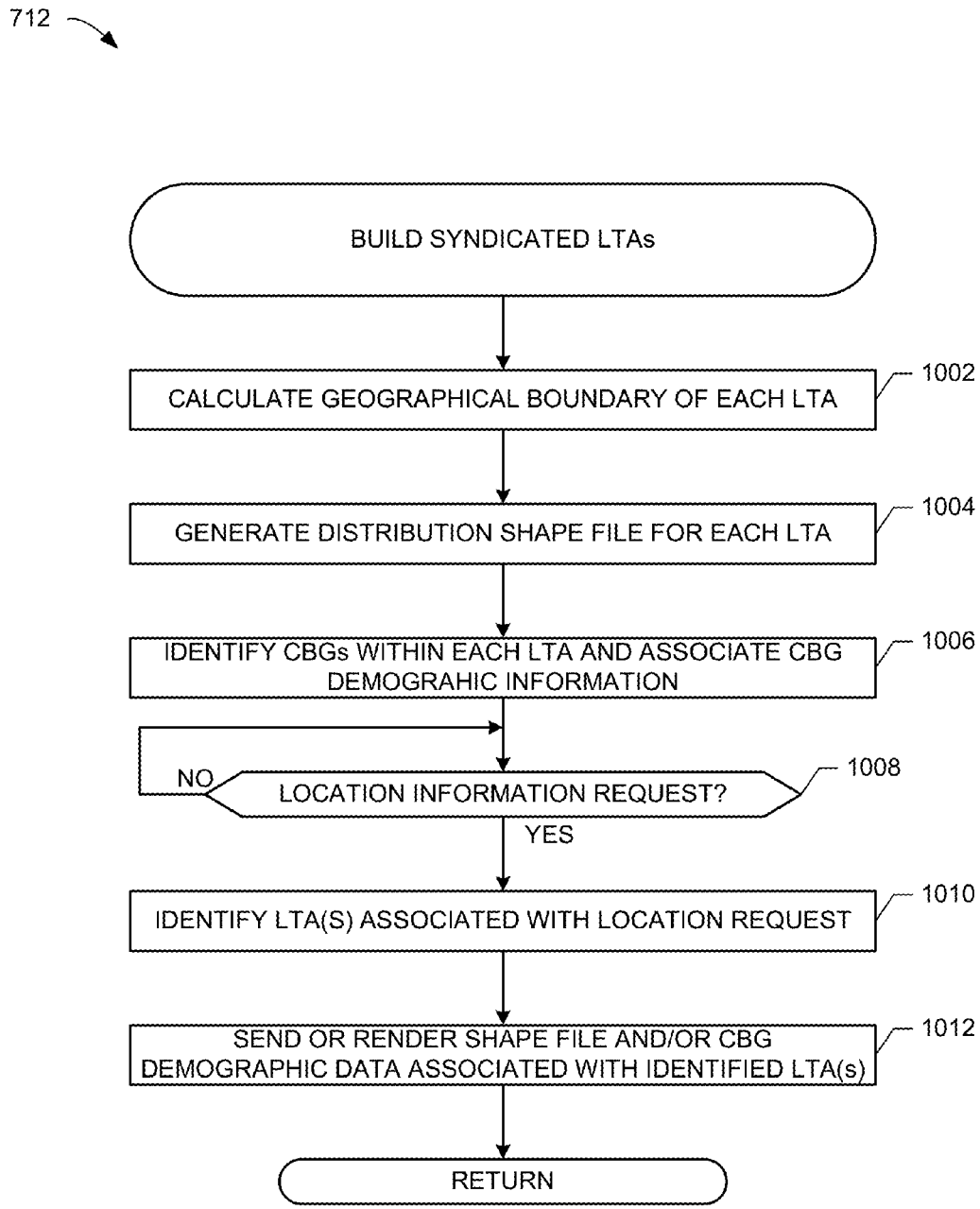

FIG. 10 includes additional detail associated with building syndicated LTAs for distribution (block 712). In the illustrated example of FIG. 10, the example LTA spatial engine 116 calculates a geographical boundary of each LTA of interest (block 1002). In some examples, the geographical boundary is a latitude-longitude center of the LTA based on a geographical center of all stores associated therewith. The example shape file generator 120 generates a distribution shape file of each LTA of interest (block 1004), and the example LTA builder 118 augments the distribution shape file to include demographic information associated with the one or more CBGs associated with the LTA (block 1006). In response to a request for information related to an LTA of interest, as determined by the example client interface 122 (block 1008), the example LTA builder 118 identifies which LTA is the subject of the query (block 1010) and sends or renders the shape file (or a portion thereof) to the requesting client (block 1012), as shown in the example LTA map 600 of FIG. 6. In some examples, the example shape file is provided to a requesting client so that interactive queries of one or more LTAs can be rendered by rendering software owned and/or otherwise managed by the client. Additionally, any data that includes an associated geographic identifier (e.g., latitude/longitude) may be rendered by the example LTA spatial engine 116 to identify LTA sales data for analysis and/or reporting purposes.

Figure 11:
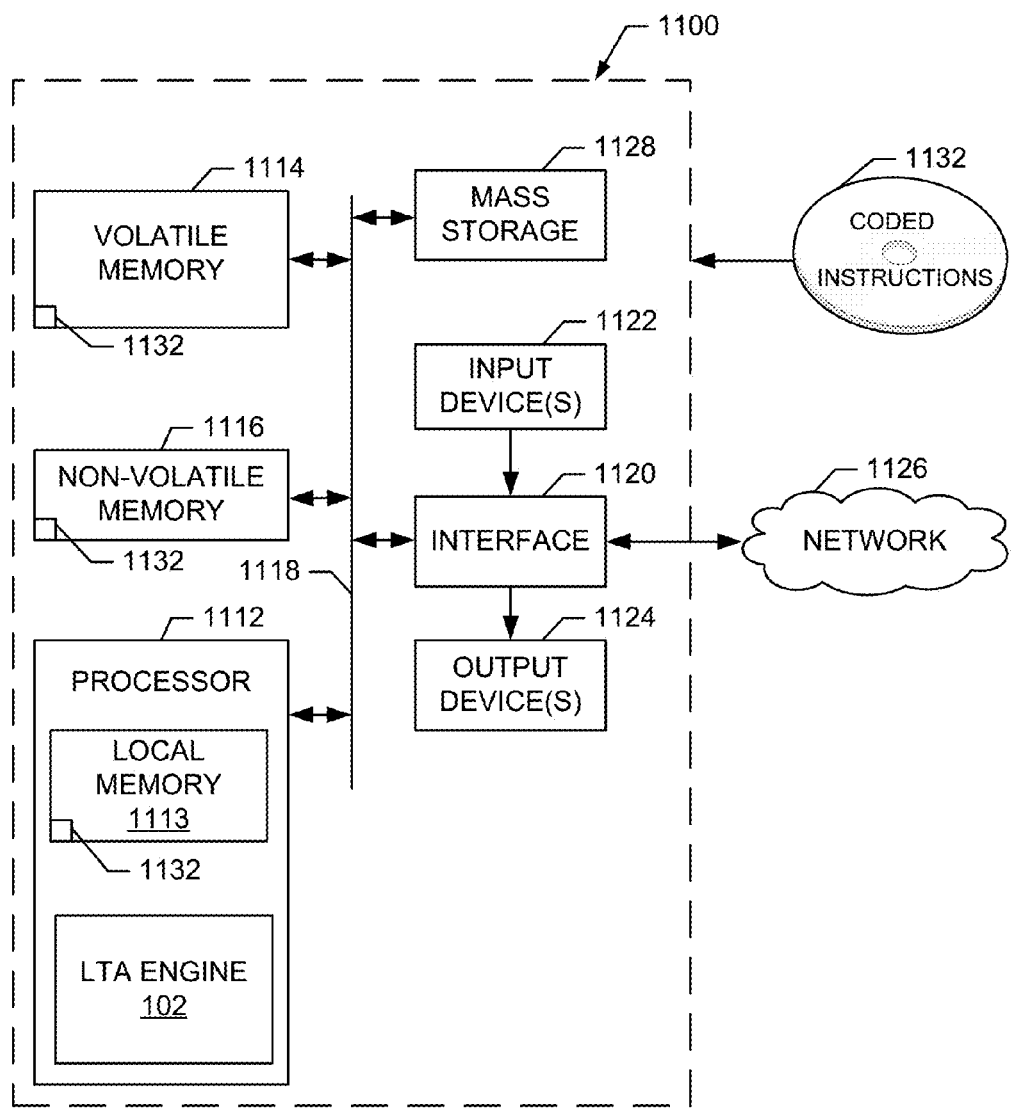
FIG. 11 is a block diagram of an example processor platform capable of executing the instructions of FIGS. 7-10 and/or to implement the local trade area development system of FIG. 1.

FIG. 11 is a block diagram of an example processor platform 1100 capable of executing the instructions of FIGS. 7-10 to implement the local trade area development system 100 of FIG. 1. The processor platform 1100 can be, for example, a server, a personal computer, a mobile device (e.g., a cell phone, a smart phone, a tablet such as an iPad™), a personal digital assistant (PDA), an Internet appliance, a set top box, or any other type of computing device.

The processor platform 1100 of the illustrated example includes a processor 1112. The processor 1112 of the illustrated example is hardware. For example, the processor 1112 can be implemented by one or more integrated circuits, logic circuits, microprocessors or controllers from any desired family or manufacturer.

The processor 1112 of the illustrated example includes a local memory 1113 (e.g., a cache). The processor 1112 of the illustrated example is in communication with a main memory including a volatile memory 1114 and a non-volatile memory 1116 via a bus 1118. The volatile memory 1114 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1116 may be implemented by flash memory and/or any other desired type of memory device. Access to the main memory 1114, 1116 is controlled by a memory controller.

The processor platform 1100 of the illustrated example also includes an interface circuit 1120. The interface circuit 1120 may be implemented by any type of interface standard, such as an Ethernet interface, a universal serial bus (USB), and/or a PCI express interface.

In the illustrated example, one or more input devices 1122 are connected to the interface circuit 1120. The input device(s) 1122 permit(s) a user to enter data and commands into the processor 1112. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1124 are also connected to the interface circuit 1120 of the illustrated example. The output devices 1124 can be implemented, for example, by display devices (e.g., a light emitting diode (LED), an organic light emitting diode (OLED), a liquid crystal display, a cathode ray tube display (CRT), a touchscreen). The interface circuit 1120 of the illustrated example, thus, typically includes a graphics driver card, a graphics driver chip or a graphics driver processor.

The interface circuit 1120 of the illustrated example also includes a communication device such as a transmitter, a receiver, a transceiver, a modem and/or network interface card to facilitate exchange of data with external machines (e.g., computing devices of any kind) via a network 1126 (e.g., an Ethernet connection, a digital subscriber line (DSL), a telephone line, coaxial cable, a cellular telephone system, etc.).

The processor platform 1100 of the illustrated example also includes one or more mass storage devices 1128 for storing software and/or data. Examples of such mass storage devices 1128 include floppy disk drives, hard drive disks, compact disk drives, Blu-ray disk drives, RAID systems, and digital versatile disk (DVD) drives.

The coded instructions 1132 of FIGS. 7-10 may be stored in the mass storage device 1128, in the volatile memory 1114, in the non-volatile memory 1116, and/or on a removable tangible computer readable storage medium such as a CD or DVD.

From the foregoing, it will be appreciated that the above disclosed methods, apparatus and articles of manufacture prevent erroneous disclosure of client information that may violate contractual agreements between market research entities and retailers from which market information is obtained (e.g., purchased). While particular retailers may generate revenue by selling marketing information (e.g., sales data) to the market research entities, the granularity of such sold marketing information may, in some circumstances, reveal too much about the retailer that may affect its competitive advantage. As such, examples disclosed herein identify a balance between data granularity allowed by such retailers, as defined by particular releasability rules and/or contracts, and useful market information that can be sold via syndicated market services.

Examples disclosed herein also improve retailer marketing efforts such that particular geographic areas of interest may be targeted that have a degree of relevance to the retailer's operation(s), which is not available through publically available Census Bureau information. As a result, examples disclosed herein reduce wasteful marketing efforts based merely on a target geography associated with a CBG with which the retailer is associated.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A computer-implemented method to identify a local trade area (LTA), comprising:
    selecting, by executing an instruction with a processor, census block groups (CBGs) associated with a retailer location, the CBGs retrieved via a network from a storage location;
    identifying, by executing an instruction with the processor, stores within the selected CBGs and associated all commodities volume (ACV) values for respective ones of the stores, the ACV values retrieved via the network from the storage location;
    calculating, by executing an instruction with the processor, similarity index values associated with respective pairs of the stores;
    reducing computational waste associated with analyzing dissimilar stores by generating, by executing an instruction with the processor, local trade areas (LTAs) of subgroups of the stores based on a comparison of the similarity index values to a similarity threshold value; and
    when a respective one of the LTAs includes a violation of a releasability criterion during transmission of data associated with the LTAs, preventing, by executing an instruction with the processor, erroneous disclosure of market share information by re-distributing the stores within the respective one of the LTAs to a geographically adjacent LTA.

2. A computer-implemented method as defined in claim 1, further including calculating the similarity index values based on a ratio of (a) a sum of ACV values of respective pairs of the stores that share a common CBG and (b) a sum of ACV values of the respective pairs of the stores from all CBGs in which they contribute.

3. A computer-implemented method as defined in claim 1, further including calculating a geographical center of the LTAs, the geographical center based on geographical coordinates of the subgroups of the stores.

4. A computer-implemented method as defined in claim 1, wherein the releasability criterion violation represents a store sales amount within a geographical area defined by one of the LTAs.

5. A computer-implemented method as defined in claim 1, wherein re-distributing the stores to the geographically adjacent LTA includes re-distributing to two or more geographically adjacent LTAs.

6. A computer-implemented method as defined in claim 5, further including verifying the two or more geographically adjacent LTAs satisfy the releasability criterion by re-calculating a market share value of respective stores in the two or more geographically adjacent LTAs.

7. A computer-implemented method as defined in claim 1, further including identifying the geographically adjacent LTA as ready for syndicated distribution when the releasability criterion is not violated.

8. A computer-implemented method as defined in claim 1, further including generating a distribution shape file of the geographically adjacent LTA.

9. A computer-implemented method as defined in claim 8, further including adding demographic information associated with respective CBGs to the distribution shape file.

10. An apparatus to identify a local trade area (LTA), comprising:
    a census block group (CBG) interface to select CBGs associated with a retailer location, the CBGs retrieved via a network from a storage location;
    an all commodities volume (ACV) interface to identify stores within the selected CBGs and associated ACV values for respective ones of the stores, the ACV values retrieved via the network from the storage location;
    a similarity index engine to calculate similarity index values associated with respective pairs of the stores;
    a local trading area builder to reduce computational waste associated with an analysis of dissimilar stores by generating local trade areas (LTAs) of subgroups of the stores based on a comparison of the similarity index values to a similarity threshold value; and
    a release requirement manager to, when a respective one of the LTAs includes a violation of a releasability criterion, prevent erroneous disclosure of market share information criterion during transmission of data associated with the LTAs by re-distributing the stores within the respective one of the LTAs to a geographically adjacent LTA, at least one of the census block group interface, the all commodities volume interface, the similarity index engine, the local trading area building, and the release requirement manager including a logic circuit.

11. An apparatus as defined in claim 10, wherein the similarity index engine is to calculate the similarity index values based on a ratio of (a) a sum of ACV values of respective pairs of the stores that share a common CBG and (b) a sum of ACV values of the respective pairs of the stores from all CBGs in which they contribute.

12. An apparatus as defined in claim 10, further including an LTA spatial engine to calculate a geographical center of the LTAs, the geographical center based on geographical coordinates of the subgroups of the stores.

13. An apparatus as defined in claim 10, wherein the releasability criterion violation represents a store sales amount within a geographical area defined by one of the LTAs.

14. An apparatus as defined in claim 10, wherein the release requirement manager is to re-distribute to two or more geographically adjacent LTAs.

15. An apparatus as defined in claim 14, further including a market share calculator to verify the two or more geographically adjacent LTAs satisfy the releasability criterion by re-calculating a market share value of respective stores in the two or more geographically adjacent LTAs.

16. An apparatus as defined in claim 10, wherein the local trading area builder is to identify the geographically adjacent LTA as ready for syndicated distribution when the releasability criterion is not violated.

17. An apparatus as defined in claim 10, further including a shape file generator to generate a distribution shape file of the geographically adjacent LTAs.

18. An apparatus as defined in claim 17, wherein the local trading area builder is to provide sales data based on a received geographic coordinate, the sales data associated with at least one LTA located proximate to the received geographic coordinate.

19. A tangible computer-readable storage medium comprising computer-readable instructions that, when executed, cause a processor to, at least:
    select census block groups (CBGs) associated with a retailer location, the CBGs retrieved via a network from a storage location;
    identify stores within the selected CBGs and associated all commodities volume (ACV) values for respective ones of the stores, the ACV values retrieved via the network from the storage location;
    calculate similarity index values associated with respective pairs of the stores;
    reduce computational waste associated with analyzing dissimilar stores by generating local trade areas (LTAs) of subgroups of the stores based on a comparison of the similarity index values to a similarity threshold value; and
    when a respective one of the LTAs includes a violation of a releasability criterion during transmission of data associated with the LTAs, prevent erroneous disclosure of market share information by re-distributing the stores within the respective one of the LTAs to a geographically adjacent LTA.

20. A tangible computer-readable storage medium as defined in claim 19, wherein the instructions, when executed, cause the processor to calculate the similarity index values based on a ratio of (a) a sum of ACV values of respective pairs of the stores that share a common CBG and (b) a sum of ACV values of the respective pairs of the stores from all CBGs in which they contribute.

* * * * *